United States Patent
Kawabata

(10) Patent No.: US 6,813,392 B2
(45) Date of Patent: Nov. 2, 2004

(54) METHOD AND APPARATUS FOR ALIGNING MULTIPLE SCANS OF THE SAME AREA OF A MEDIUM USING MATHEMATICAL CORRELATION

(75) Inventor: Jamie L. Kawabata, Austin, TX (US)

(73) Assignee: Eastman Kodak Company, Rochester, NY (US)

(*) Notice: Subject to any disclaimer, the term of this patent is extended or adjusted under 35 U.S.C. 154(b) by 694 days.

(21) Appl. No.: 09/745,063

(22) Filed: Dec. 20, 2000

(65) Prior Publication Data

US 2001/0033702 A1 Oct. 25, 2001

Related U.S. Application Data

(60) Provisional application No. 60/174,094, filed on Dec. 30, 1999.

(51) Int. Cl.$^7$ ................................................. G06K 9/32
(52) U.S. Cl. ....................... 382/294; 358/408; 358/474; 358/486; 358/505; 382/293; 382/318
(58) Field of Search ................................. 382/294, 103, 382/151, 184, 193, 287, 318; 358/408, 486, 474, 489, 491, 493, 494; 348/110, 116, 639; 367/39, 40, 41, 42, 100, 125; 359/17, 201, 202

(56) References Cited

U.S. PATENT DOCUMENTS

| | | | |
|---|---|---|---|
| 2,404,138 A | 7/1946 | Mayer ............................ | 95/94 |
| 3,520,689 A | 7/1970 | Nagae et al. ................... | 96/55 |
| 3,520,690 A | 7/1970 | Nagae et al. ................... | 96/55 |
| 3,587,435 A | 6/1971 | Chioffe ........................... | 95/89 |
| 3,615,479 A | 10/1971 | Kohler et al. .................. | 96/48 |
| 3,615,498 A | 10/1971 | Aral ............................... | 96/55 |
| 3,617,282 A | 11/1971 | Bard .............................. | 96/59 |
| 3,680,463 A | * 8/1972 | Attridge et al. ............. | 396/569 |
| 3,747,120 A | 7/1973 | Stemme ....................... | 346/75 |
| 3,833,161 A | 9/1974 | Krumbein .................... | 226/92 |
| 3,903,541 A | 9/1975 | Von Meister et al. ....... | 354/317 |

(List continued on next page.)

FOREIGN PATENT DOCUMENTS

| | | | |
|---|---|---|---|
| EP | 0 261 782 A2 | 8/1987 | ............ H04N/1/46 |
| EP | 0 422 220 A1 | 3/1989 | ............ A61B/6/03 |
| EP | 0 482 790 B1 | 9/1991 | ............ H04N/1/40 |
| EP | 0 525 886 A3 | 7/1992 | ............ G03D/5/00 |
| EP | 0 580 293 A1 | 6/1993 | ............ H04N/1/04 |
| EP | 0 601 364 A1 | 6/1994 | ........... H04N/1/387 |
| EP | 0 669 753 A2 | 2/1995 | ........... H04N/1/407 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

(List continued on next page.)

*Primary Examiner*—Bhavesh M. Mehta
*Assistant Examiner*—Abolfazl Tabatabai
(74) *Attorney, Agent, or Firm*—Dinsmore & Shohl

(57) ABSTRACT

An image alignment method and system for aligning two digital images which were intended to be scanned from the same portion of medium, but which may be skewed somewhat. A portion of the first digital image is selected as the target region and a portion of the second digital image is selected as a variable or movable region. Data from the two regions can be subjected to a mathematical or statistical algorithm which determines how well the data from the regions match or correlate. Then, a new region can be selected to serve as the variable region from the second digital image and the correlation algorithm can be conducted again. This process can be repeated on a number of regions from the second digital image. Regions having the highest mathematical correlation can then be used to determine offsets which indicate the amount of skew or misalignment between the two digital images.

15 Claims, 11 Drawing Sheets

U.S. PATENT DOCUMENTS

| | | | |
|---|---|---|---|
| 3,946,398 A | 3/1976 | Kyser et al. ............... 346/1 |
| 3,959,048 A | 5/1976 | Stanfield et al. ............. 156/94 |
| 4,026,756 A | 5/1977 | Stanfield et al. ............ 156/554 |
| 4,081,577 A | 3/1978 | Horner ....................... 427/424 |
| 4,142,107 A | 2/1979 | Hatzakis et al. ............ 250/571 |
| 4,215,927 A | 8/1980 | Grant et al. ................. 354/317 |
| 4,249,985 A | 2/1981 | Stanfield ..................... 156/554 |
| 4,265,545 A | 5/1981 | Slaker ......................... 356/431 |
| 4,301,469 A | 11/1981 | Modeen et al. ................ 358/75 |
| 4,490,729 A | 12/1984 | Clark et al. ................... 346/75 |
| 4,501,480 A | 2/1985 | Matsui et al. ................ 354/298 |
| 4,564,280 A | 1/1986 | Fukuda ....................... 354/317 |
| 4,594,598 A | 6/1986 | Iwagami ..................... 346/140 |
| 4,621,037 A | 11/1986 | Kanda et al. ................. 430/30 |
| 4,623,236 A | 11/1986 | Stella ......................... 354/318 |
| 4,633,300 A | 12/1986 | Sakai ........................... 358/41 |
| 4,636,808 A | 1/1987 | Herron ......................... 346/75 |
| 4,666,307 A | 5/1987 | Matsumoto et al. ........ 356/404 |
| 4,670,779 A | 6/1987 | Nagano ........................ 358/75 |
| 4,736,221 A | 4/1988 | Shidara ....................... 354/317 |
| 4,741,621 A | 5/1988 | Taft et al. .................... 356/376 |
| 4,745,040 A | 5/1988 | Levine ......................... 430/21 |
| 4,755,844 A | 7/1988 | Tsuchiya et al. ............ 354/317 |
| 4,760,397 A * | 7/1988 | Piccoluraz .................... 342/75 |
| 4,777,102 A | 10/1988 | Levine ......................... 430/21 |
| 4,796,061 A | 1/1989 | Ikeda et al. ................... 355/73 |
| 4,814,630 A | 3/1989 | Lim ............................ 250/578 |
| 4,821,114 A | 4/1989 | Gebhardt ..................... 358/75 |
| 4,845,551 A | 7/1989 | Matsumoto .................. 358/80 |
| 4,851,311 A | 7/1989 | Millis et al. ................... 430/30 |
| 4,857,430 A | 8/1989 | Millis et al. ................... 430/30 |
| 4,875,067 A | 10/1989 | Kanzaki et al. ............. 354/325 |
| 4,969,045 A | 11/1990 | Haruki et al. ............... 358/228 |
| 4,994,918 A * | 2/1991 | Lingemann .................. 348/97 |
| 5,027,146 A | 6/1991 | Manico et al. .............. 354/299 |
| 5,027,422 A * | 6/1991 | Peregrim et al. ........... 382/294 |
| 5,034,767 A | 7/1991 | Netz et al. ................... 354/317 |
| 5,101,286 A | 3/1992 | Patton ......................... 358/487 |
| 5,124,216 A | 6/1992 | Giapis et al. .................. 430/30 |
| 5,129,010 A * | 7/1992 | Higuchi et al. ............. 382/154 |
| 5,155,596 A | 10/1992 | Kurtz et al. ................. 358/214 |
| 5,196,285 A | 3/1993 | Thomson ..................... 430/30 |
| 5,200,817 A | 4/1993 | Birnbaum .................... 358/80 |
| 5,212,512 A | 5/1993 | Shiota ......................... 354/319 |
| 5,231,439 A | 7/1993 | Takahashi et al. .......... 354/313 |
| 5,235,352 A | 8/1993 | Pies et al. ................... 346/140 |
| 5,255,408 A | 10/1993 | Blackman .................... 15/308 |
| 5,266,805 A | 11/1993 | Edgar ......................... 250/330 |
| 5,267,030 A | 11/1993 | Giorgianni et al. ......... 358/527 |
| 5,292,605 A | 3/1994 | Thomson ..................... 430/30 |
| 5,296,923 A | 3/1994 | Hung ......................... 358/527 |
| 5,334,247 A | 8/1994 | Columbus et al. .......... 118/411 |
| 5,350,651 A | 9/1994 | Evans et al. .................. 430/21 |
| 5,350,664 A | 9/1994 | Simons ....................... 430/362 |
| 5,357,307 A | 10/1994 | Glanville et al. ............ 354/324 |
| 5,360,701 A | 11/1994 | Elton et al. .................. 430/501 |
| 5,371,542 A | 12/1994 | Pauli et al. .................. 348/262 |
| 5,391,443 A | 2/1995 | Simons et al. ................ 430/21 |
| 5,414,779 A | 5/1995 | Mitch ......................... 382/199 |
| 5,416,550 A | 5/1995 | Skye et al. .................. 354/298 |
| 5,418,119 A | 5/1995 | Simons ....................... 430/507 |
| 5,418,597 A | 5/1995 | Lahcanski et al. ........... 355/76 |
| 5,432,579 A | 7/1995 | Tokuda ....................... 354/293 |
| 5,436,738 A | 7/1995 | Manico ....................... 358/503 |
| 5,440,365 A | 8/1995 | Gates et al. ................. 354/298 |
| 5,447,811 A | 9/1995 | Buhr et al. .................... 430/20 |
| 5,448,380 A | 9/1995 | Park ........................... 358/520 |
| 5,452,018 A | 9/1995 | Capitant et al. ............. 348/651 |
| 5,465,155 A | 11/1995 | Edgar ......................... 358/500 |
| 5,477,345 A | 12/1995 | Tse ............................ 358/500 |
| 5,496,669 A | 3/1996 | Pforr et al. .................... 430/22 |
| 5,516,608 A | 5/1996 | Hobbs et al. ................. 430/30 |
| 5,519,510 A * | 5/1996 | Edgar ......................... 358/471 |
| 5,546,477 A | 8/1996 | Knowles et al. ............ 382/242 |
| 5,550,566 A | 8/1996 | Hodgson et al. ............ 345/202 |
| 5,552,904 A | 9/1996 | Ryoo et al. ................. 358/518 |
| 5,563,717 A | 10/1996 | Koeng et al. ............... 358/406 |
| 5,568,270 A | 10/1996 | Endo .......................... 358/298 |
| 5,576,836 A | 11/1996 | Sano et al. ................. 358/302 |
| 5,581,376 A | 12/1996 | Harrington ................. 358/518 |
| 5,587,752 A | 12/1996 | Petruchik .................... 396/315 |
| 5,596,415 A | 1/1997 | Cosgrove et al. ........... 358/296 |
| 5,627,016 A | 5/1997 | Manico ....................... 430/434 |
| 5,649,260 A | 7/1997 | Wheeler et al. ............. 396/569 |
| 5,650,814 A * | 7/1997 | Florent et al. ................ 348/39 |
| 5,664,253 A | 9/1997 | Meyers ....................... 396/603 |
| 5,664,255 A | 9/1997 | Wen ........................... 396/627 |
| 5,667,944 A | 9/1997 | Reem et al. ................ 430/359 |
| 5,678,116 A | 10/1997 | Sugimoto et al. .......... 396/611 |
| 5,691,118 A | 11/1997 | Haye .......................... 430/357 |
| 5,695,914 A | 12/1997 | Simon et al. ............... 430/379 |
| 5,698,382 A | 12/1997 | Nakahanada et al. ....... 430/418 |
| 5,726,773 A | 3/1998 | Mehlo et al. ............... 358/474 |
| 5,739,897 A | 4/1998 | Frick et al. ................... 355/40 |
| 5,771,107 A | 6/1998 | Fujimoto et al. ........... 358/464 |
| 5,790,277 A * | 8/1998 | Edgar ......................... 358/487 |
| 5,835,795 A | 11/1998 | Craig et al. .................... 396/6 |
| 5,835,811 A | 11/1998 | Tsumura ..................... 396/598 |
| 5,870,172 A | 2/1999 | Blume ......................... 355/27 |
| 5,880,819 A | 3/1999 | Tanaka et al. ................ 355/75 |
| 5,892,595 A | 4/1999 | Yamakawa et al. ......... 358/530 |
| 5,930,388 A | 7/1999 | Murakami et al. .......... 382/167 |
| 5,959,720 A | 9/1999 | Kwon et al. .................. 355/38 |
| 5,963,662 A | 10/1999 | Vachtsevanos et al. ..... 382/150 |
| 5,966,465 A | 10/1999 | Keith et al. ................. 382/232 |
| 5,979,011 A | 11/1999 | Miyawaki et al. ........... 15/308 |
| 5,982,936 A | 11/1999 | Tucker et al. ............... 382/233 |
| 5,982,937 A | 11/1999 | Accad ........................ 382/239 |
| 5,982,941 A | 11/1999 | Loveridge et al. .......... 382/260 |
| 5,982,951 A | 11/1999 | Katayama et al. .......... 382/284 |
| 5,988,896 A | 11/1999 | Edgar ......................... 396/604 |
| 5,991,444 A | 11/1999 | Burt et al. ................... 382/232 |
| 5,998,109 A | 12/1999 | Hirabayashi ................ 430/434 |
| 6,000,284 A | 12/1999 | Shin et al. .................... 73/150 |
| 6,005,987 A | 12/1999 | Nakamura et al. .......... 382/294 |
| 6,065,824 A | 5/2000 | Bullock et al. ............... 347/19 |
| 6,069,714 A | 5/2000 | Edgar ......................... 358/487 |
| 6,088,084 A | 7/2000 | Nishio ......................... 355/75 |
| 6,089,687 A | 7/2000 | Helterline ...................... 347/7 |
| 6,101,273 A | 8/2000 | Matama ...................... 382/169 |
| 6,102,508 A | 8/2000 | Cowger ......................... 347/7 |
| 6,137,965 A | 10/2000 | Burgeios et al. ............ 396/626 |
| 6,200,738 B1 | 3/2001 | Takano et al. .............. 430/362 |

FOREIGN PATENT DOCUMENTS

| | | | | |
|---|---|---|---|---|
| EP | 0 794 454 A2 | 2/1997 | ........... G03B/27/73 |
| EP | 0 768 571 A2 | 4/1997 | .......... G03D/13/00 |
| EP | 0 806 861 A1 | 11/1997 | ............ H04N/1/00 |
| EP | 0 878 777 A2 | 11/1998 | ............. G06T/5/40 |
| EP | 0 930 498 A2 | 12/1998 | .......... G01N/21/88 |
| WO | WO 90/01240 | 2/1990 | ............ H04N/1/40 |
| WO | WO 91/09493 | 6/1991 | .......... H04N/5/217 |
| WO | WO 97/25652 | 7/1997 | ............ G03D/5/00 |
| WO | WO9743613 | 11/1997 | |
| WO | WO 98/19216 | 5/1998 | ............ G03C/5/29 |
| WO | WO9825399 | 6/1998 | |
| WO | WO9831142 | 7/1998 | |
| WO | WO 93/34157 | 8/1998 | |
| WO | WO 98/34157 | 8/1998 | |
| WO | WO9834397 | 8/1998 | |
| WO | WO 99/43148 | 8/1999 | ............ H04N/1/00 |

| | | | | |
|---|---|---|---|---|
| WO | WO 99/43149 | 8/1999 | .......... | H04N/1/100 |
| WO | WO 01/01197 | 1/2001 | ............ | G03D/5/00 |
| WO | WO 01/13174 A1 | 2/2001 | ............ | G03D/5/06 |
| WO | WO 01/45042 A1 | 6/2001 | ............. | G06T/5/00 |
| WO | WO 01/50192 A1 | 7/2001 | .......... | G03C/7/407 |
| WO | WO 01/50193 A1 | 7/2001 | ............ | G03C/7/407 |
| WO | WO 01/50194 A1 | 7/2001 | .......... | G03C/7/407 |
| WO | WO 01/50197 A1 | 7/2001 | ............ | G03C/7/42 |
| WO | WO 01/52556 A2 | 7/2001 | ............ | H04N/9/11 |

OTHER PUBLICATIONS

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4. 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Photorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characteristics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikousa.com/reference/whitepapers/imaging, Nikon Corporation, Nov. 28, 2000.

* cited by examiner

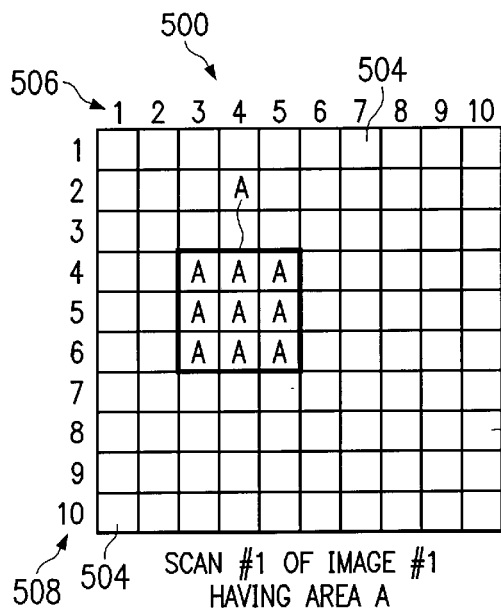
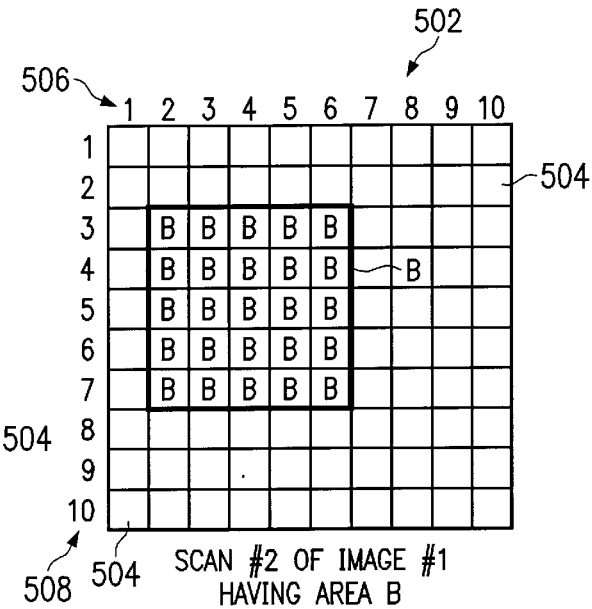
FIG. 5a  FIG. 5b
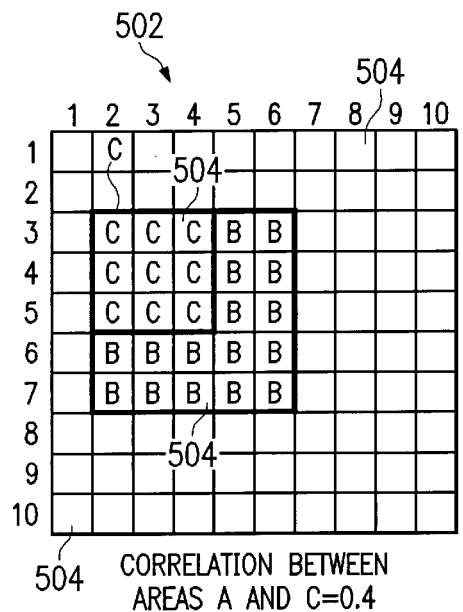
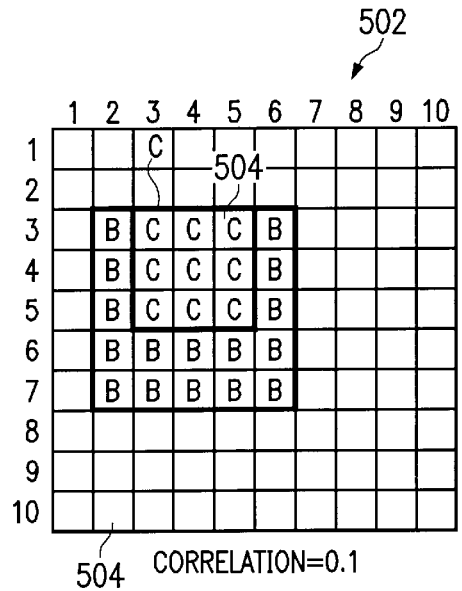
FIG. 6a  FIG. 6b

AVERAGE OF PRODUCTS=CORRELATION=0.65

FIG. 11

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| 15 | 16 | 17 | 18 | 19 | 20 | 21 | 22 | 23 | 24 | 25 | 26 | 27 | 28 |
| 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 |
| 57 | 58 | 59 | 60 | 61 | 62 | 63 | 64 | 65 | 66 | 67 | 68 | 69 | 70 |
| 71 | 72 | 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 | 97 | 98 |

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| 15 | 16 | 17 | 18 | 19 | 20 | 21 | 22 | 23 | 24 | 25 | 26 | 27 | 28 |
| 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 |
| 57 | 58 | 59 | 60 | 61 | 62 | 63 | 64 | 65 | 66 | 67 | 68 | 69 | 70 |
| 71 | 72 | 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 | 97 | 98 |

METHOD AND APPARATUS FOR ALIGNING MULTIPLE SCANS OF THE SAME AREA OF A MEDIUM USING MATHEMATICAL CORRELATION

This application claims the benefit of U.S. Provisional Application No. 60/174,094, filed Dec. 30, 1999, the entire disclosure of which is hereby incorporated herein by reference.

TECHNICAL FIELD

The present invention relates generally to digital film development systems, and more particularly to a digital film development system which includes a method and system for aligning multiple scans of the same area of film using film non-uniformity.

BACKGROUND OF THE INVENTION

Color photographic film generally comprises three layers of light sensitive material that are separately sensitive to red, green, and blue light. During conventional color photographic film development, the exposed film is chemically processed to produce dyes in the three layers with color densities directly proportional to the blue, green and red spectral exposures that were recorded on the film in response to the light reflecting from the photographed scene. Yellow dye is produced in the top layer, magenta dye in the middle layer, and cyan dye in the bottom layer, the combination of the produced dyes revealing the latent image. Once the film is developed, a separate printing process can be used to record photographic prints, using the developed film and photographic paper.

In contrast to conventional film development, digital film development systems, or digital film processing systems, have been developed. One such process involves chemically developing exposed film to form scene images comprised of silver metal particles or grains in each of the red, green, and blue recording layers of the film. Then, while the film is developing, it is scanned using electromagnetic radiation, such as light with one predominant frequency, preferably in the infrared region. In particular, as the film develops in response to chemical developer, a light source is directed to the front of the film, and a light source is directed to the back of the film. Grains of elemental silver developing in the top layer (e.g., the blue sensitive layer) are visible from the front of the film by light reflected from the front source; however, these grains are hidden from the back of the film. Similarly, grains of elemental silver developing in the bottom layer (e.g., the red sensitive layer) are visible from the back of the film by light reflected from the back source; however these grains are hidden from the front. Meanwhile, grains of elemental silver in the middle layer (e.g., the green sensitive layer) are hidden from the light reflected from the front or back; however, these grains are visible by any light transmitted through the three layers, as are those grains in the other two layers. Thus, by sensing, for each pixel location, light reflected from the front of the film, light reflected from the back of the film, and light transmitted through the film, three measurements can be acquired for each pixel. The three measured numbers for each pixel can then be solved for the three colors to arrive at three color code values for each pixel, and the plurality of colored pixels can then be printed or displayed to view the image.

Such scanning of each image on the film can occur at multiple times during the development of the film. Accordingly, features of the image which may appear quickly during development can be recorded, as well as features of the image which may not appear until later in the film development. The multiple digital image files for each image which are created by the multiple scannings can then be combined to form a single enhanced image file, which captures features of the image which appear during various development stages of the film.

However, in order to combine the multiple digital image files of a particular film image or exposure, the pixel data arrays which make up these files must be properly aligned. Otherwise, if the pixel data from one digital image is skewed with respect to the pixel data from another digital image, the combined image will not very accurately represent the image which was developing on the film.

Utilizing film sprocket holes is one potential method to align multiple digital image files. In particular, if data from a first digital image can be identified as representing a sprocket hole on the film edge, and if the corresponding sprocket hole can be identified from a second digital image, then the two digital images could be aligned. Another potential method of alignment involves identifying data from the digital image files which represent the corner of the film exposure. In particular, if data from a first digital image can be identified as representing the corner of the film image or exposure, and if the corresponding corner can be identified from a second digital image, then the two digital images could be aligned.

However, such methods are not without disadvantages. In particular, identifying sprocket holes from a digital image file can be difficult. Because sprocket holes are three dimensional in nature, the edges of the hole can appear very fuzzy and not well-defined. Moreover, at high resolution, the sprocket holes appear very large in the digital image file, and so large portions of data must be processed for aligning such holes. Moreover, minor differences in illumination between the two scannings of the film can cause different shadows or highlights to appear between the two resulting digital image files, making the identification of two corresponding sprocket holes difficult. In addition, sprocket holes can be mangled during picture taking or film development, creating additional identification problems. Finally, if film is not kept taut during the multiple scannings, even if the sprocket holes can be aligned, the rest of the digital image files still might not be accurately aligned.

Locating corners of an exposure also can have disadvantages. In particular, not every exposure will have a well-defined corner. For example, an exposure that has dark surroundings, such as a picture of the moon at night for example, might not include an identifiable corner of the exposure frame. Moreover, early during the film development, corners of an exposure are typically not very well-defined. Thus, it can be difficult to identify a corner of an exposure from a digital image file that was created by scanning early during the development of the exposure.

Accordingly, there remains a need for a more accurate method and apparatus for more accurately and easily aligning multiple scans of the same portion of a medium. In particular, there remains a need for such a method and apparatus which can be used to align multiple digital image files which were created by scanning the same film exposure during multiple film development stages of the exposure.

SUMMARY OF THE INVENTION

According to one embodiment of the invention, a method is provided for aligning two or more digital images created by scanning the same portion of a medium. The method comprises obtaining a first digital image and obtaining a second digital image. A target portion is selected from the first digital image, and a first portion is selected from the second digital image. A first mathematical correlation between the target portion and the first portion is calculated. One or more additional portions of the second digital image are selected, and mathematical correlations between the target portion and these additional portions are calculated. An alignment offset between the two images is determined using the mathematical correlations. For instance, a curve can be fit through the highest correlation and each of its neighboring correlations, and the vertex of the curve can be used for the alignment offset. Once aligned, the images can be combined to create a single digital image.

It is an advantage of at least one exemplary embodiment of the present invention to accurately align two or more digital images.

An advantage of at least one exemplary embodiment of the present invention is to align digital images without reliance on features of the scene which the digital image represents.

It is an advantage of one or more exemplary embodiments of the invention to align digital images scanned from the same frame of film, without reliance on film sprocket holes or the scene exposed on the film.

Still other advantages of various embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which like reference numerals indicate corresponding structure throughout the figures.

FIGS. 5a and 5b are examples of two digital images which can be aligned by correlating data from regions of the images, in accordance with principles of the present invention;

FIG. 6a through FIG. 6i illustrate the selection of various regions within the image of FIG. 5b for correlation with a target region in the image of FIG. 5a, according to principles of the present invention;

FIG. 11 illustrates an example of the alignment of two images using a sub-pixel alignment offset, which can be derived according to principles of the present invention.

DETAILED DESCRIPTION OF EXEMPLARY EMBODIMENTS

In general, the present invention relates to an image alignment method and system for aligning two digital images which were intended to be scanned from the same portion of film, but which may be skewed somewhat due to movement of the film and/or differences in the scanning equipment which created the images. More specifically, a portion of the first digital image is selected as the target region and a portion of the second digital image is selected as a variable or movable region. Data from the two regions can be subjected to a mathematical algorithm which determines how well the data from the regions match or correlate. Then, a new region can be selected to serve as the variable region from the second digital image and the correlation algorithm can be conducted again. This process can be repeated on a number of regions from the second digital image. Regions having the highest mathematical correlation can then be used to determine offsets which indicate the amount of skew or misalignment between the two digital images. Once accurate offsets are known, the image files can be aligned, such as for combining into a single enhanced image in a digital film development system. Preferably, the data from the two digital images reflects a non-uniformity in the film which will be present even if a scene has not been exposed on the film or has not yet developed on the film. The "graininess" or grain pattern of the film is one example of such a non-uniformity which varies randomly across the film, but which will also appear relatively constant between two scans of the same piece of film. The alignment method has application to various scanning methods and apparatus, such as digital film development systems for example, where multiple digital images are created for each developing film frame at varying development times, each image being created by recording light reflected from the front and back of the film, and light transmitted through the film.

Figure 1:
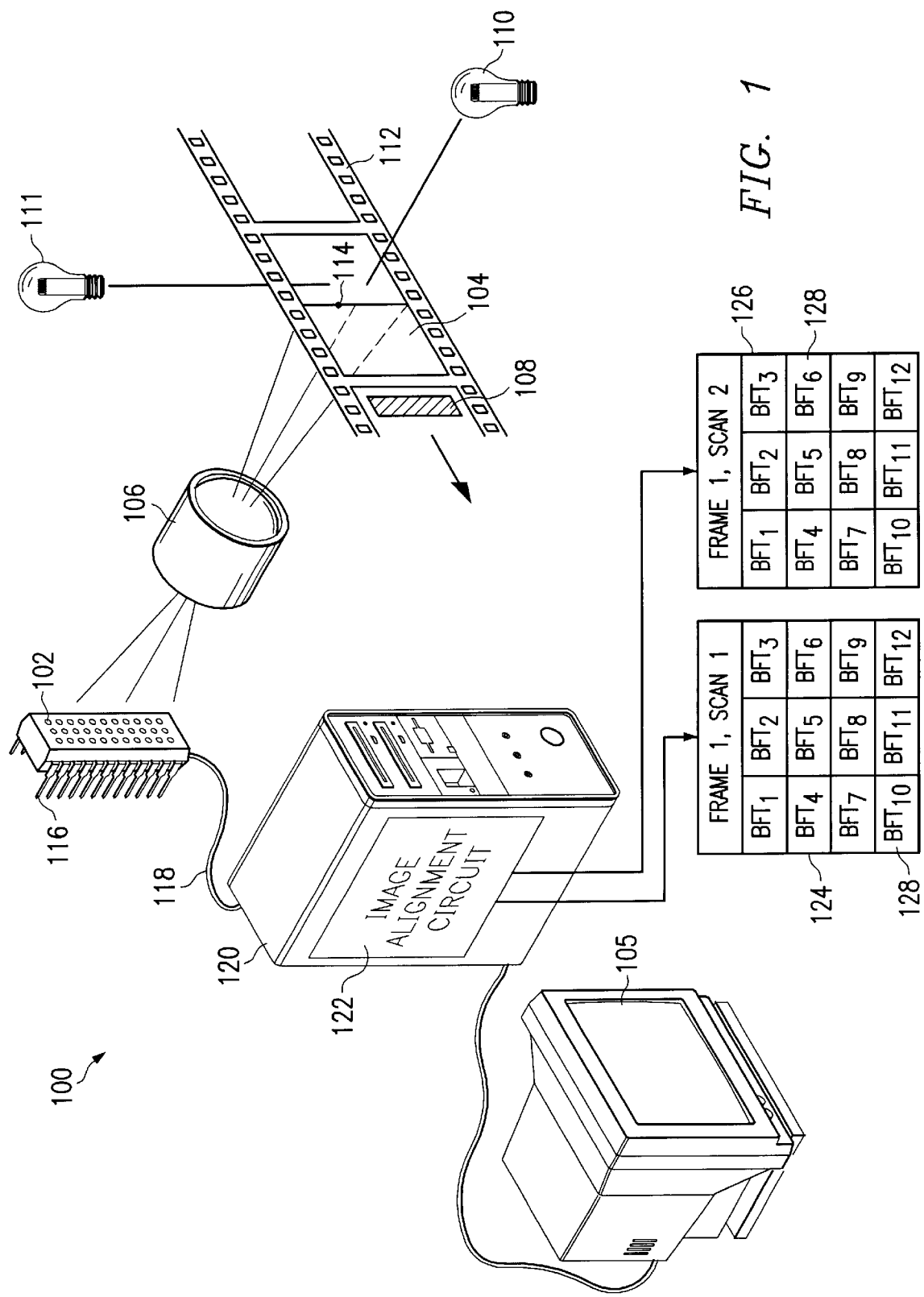
FIG. 1 is a perspective view of an exemplary digital film development system which can be used with the methods and apparatus of the present invention.

FIG. 1 shows an improved digital film developing system 100. The system operates by converting electromagnetic radiation from an image to an electronic (digital) representation of the image. The image being scanned is typically embodied in a physical form, such as on a photographic film media 112 which is being developed using chemical developer, although other media may be used. In many applications, the electromagnetic radiation used to convert the image into a digital representation is infrared light; however, visible light, microwave and other suitable types of electromagnetic radiation may also be used to produce the digitized image. The scanning system 100 generally includes a number of optic sensors 102, which measure the intensity of electromagnetic energy passing through or reflected by the film 112. The source of electromagnetic energy is typically a light source 110 which illuminates the film 112 containing the scene image 104 and 108 to be scanned, which are forming on the film during the film development. Radiation from the source 110 may be diffused or directed by additional optics such as filters (not shown)

and one or more lenses 106 positioned between the sensor 102 and the film 112 in order to illuminate the images 104 and 108 more uniformly. Furthermore, more than one source may be used. Source 110 is positioned on the side of the film 112 opposite the optic sensors 102. This placement results in sensors 102 detecting radiation emitted from source 110 as it passes through the images 104 and 108 on the film 112. Another radiation source 111 is shown placed on the same side of the film 112 as the sensors 102. When source 111 is activated, sensors 102 detect radiation reflected by the images 104 and 108. This process of using two sources positioned on opposite sides of the film being scanned is described in more detail below in conjunction with FIG. 2 The system 100 may be part of a larger optical and electronic system.

The optic sensors 102 are generally geometrically positioned in arrays such that the electromagnetic energy striking each optical sensor 102 corresponds to a distinct location 114 in the image 104. Accordingly, each distinct location 114 in the scene image 104 corresponds to a distinct location, referred to as a picture element, or "pixel" for short, in a scanned image, or digital image file, which comprises a plurality of pixel data. The images 104 and 108 on film 112 can be sequentially moved, or scanned relative to the optical sensors 102. The optical sensors 102 are typically housed in a circuit package 116 which is electrically connected, such as by cable 118, to supporting electronics for storage and digital image processing, shown together as computer 120. Computer 120 can then process the digital image data and display it on output device 105. Alternatively, computer 120 can be replaced with a microprocessor or controller and cable 118 replaced with an electrical connection.

Optical sensors 102 may be manufactured from different materials and by different processes to detect electromagnetic radiation in varying parts and bandwidths of the electromagnetic spectrum. For instance, the optical sensor 102 can comprise a photodetector that produces an electrical signal proportional to the intensity of electromagnetic energy striking the photodetector. Accordingly, the photodetector measures the intensity of electromagnetic radiation attenuated by the images 104 and 108 on film 112.

Figure 2:
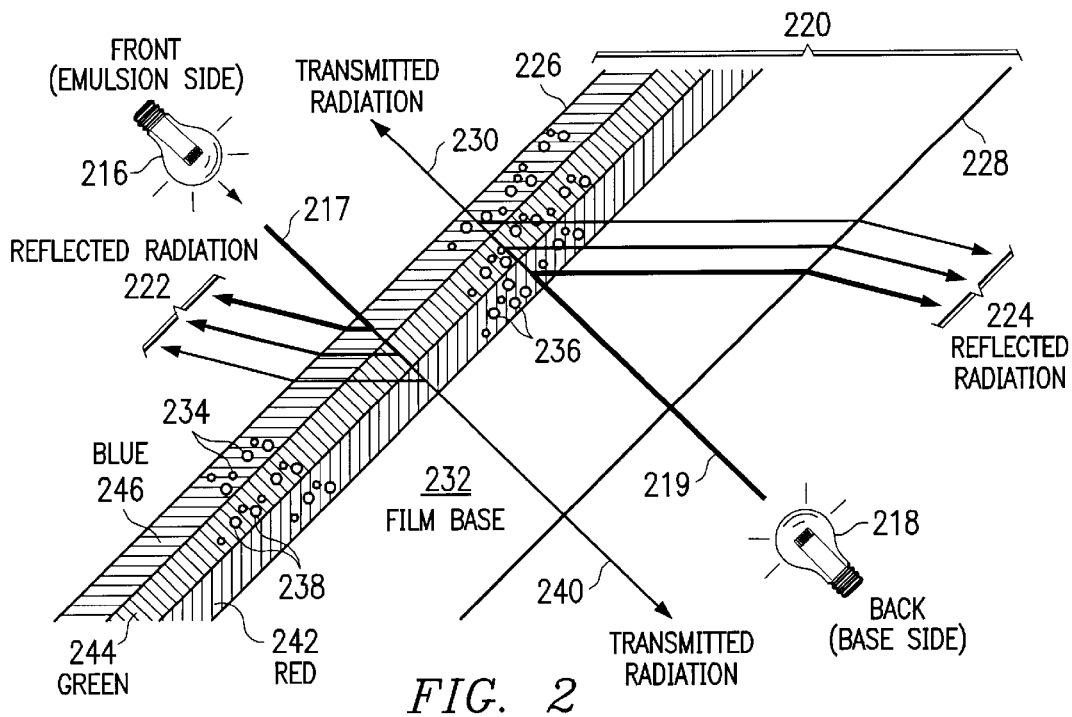
FIG. 2 illustrates an exemplary operation of the digital film development system of FIG. 1.

Turning now to FIG. 2, a color film 220 is depicted. As previously described, the embodiments of the present invention described herein can use duplex film scanning which refers to using a front source 216 and a back source 218 to scan the developing film 220 with radiation 217 and 219. The applied radiation 217 and 219 results in reflected radiation 222 from the front 226 and reflected radiation 224 from the back 228 of the film 220, as well as transmitted radiation 230 and 240 that passes through all layers of the film 220. While the sources 216, 218 may emit a polychromatic light, i.e., multi-frequency light, the sources 216, 218 are generally monochromatic, such as infrared light for example. The resulting radiation 222, 224, 230, and 240 are referred to herein as front, back, front-through and back-through, respectively, and are further described below.

In FIG. 2, separate color layers are viewable within the film 220 during development of the red layer 242, green layer 244 and blue layer 246. More specifically, over a clear film base 232 are three layers 242, 244, 246 sensitive separately to red, green, and blue light, respectively. These layers are not physically the colors; rather, they are sensitive to these colors. In conventional color film development, the blue sensitive layer 246 would eventually develop a yellow dye, the green sensitive layer 244 a magenta dye, and the red sensitive layer 242 a cyan dye.

During chemical development of the film 220, such as by using a developer, layers 242, 244, and 246 are opalescent. Dark silver grains 234 developing in the top layer 246, (the blue source layer), are visible from the front 226 of the film by radiation 222, and slightly visible from the back 228 because of the bulk of the opalescent developer emulsion. Similarly, grains 236 in the bottom layer 242 (the red sensitive layer) are visible from the back 228 by reflected radiation 224, but are much less visible from the front 226. Grains 238 in the middle layer 244, the green sensitive layer, are only slightly visible to reflected radiation 222, 224 from the front 226 or the back 228. However, they are visible along with those in the other layers by transmitted radiation 230 and 240. By sensing radiation reflected from the front 226 and the back 228 as well as radiation transmitted through the film 220 from both the front 226 and back 228 of the film, each pixel in the film 220 yields four measured values, that may be mathematically solved for the three colors, red, green, and blue, closest to the original scene, such as by using a matrix transformation as described in U.S. Pat. No. 5,519,510 for example, the entire disclosure of which is hereby incorporated herein by reference.

The front signal records the radiation 222 reflected from the illumination sources 216 in front of the film 220. The set of front signals for an image is called the front channel (F). The front channel principally, but not entirely, records the attenuation in the radiation from the source 216 due to the silver metal particles or grains 234 in the top-most layer 246, which is the blue recording layer. There is also some attenuation of the front channel due to silver metal particles 236, 238 in the red and green layers 242, 244.

The back signal records the radiation 224 reflected from the illumination sources 218 in back of the film 220. The set of back signals for an image is called the back channel (B). The back channel principally, but not entirely, records the attenuation in the radiation from the source 218 due to the silver metal particles 236 in the bottom-most layer 242, which is the red recording layer. Additionally, there is some attenuation of the back channel due to silver metal particles 234, 238 in the blue and green layers 246, 244.

The front-through signal records the radiation 230 that is transmitted through the film 220 from the illumination source 218 in back of the film 220. The set of front-through signals for an image is called the front-through channel. Likewise, the back-through signal records the radiation 240 that is transmitted through the film 220 from the source 216 in front of the film 220. The set of back-through signals for an image is called the back-through channel. Both through channels (T) record essentially the same image information since they both record attenuation of the radiation 230, 240 due to the silver metal particles 234, 236, 238 in all three red, green, and blue recording layers 242, 244, 246 of the film 220. Accordingly, one of the through channel signals can be disregarded.

Several image processing steps can then be used to convert the illumination source radiation information for each channel (B, F, and T) to the red, green, blue values similar to those procured by convention scanners for each spot on the film 220. These steps are required because the silver metal particles 234, 236, 238 that form during the development process are not spectrally unique in each of the film layers 242, 244, 246. These image processing steps are not performed when conventional scanners are used to scan film after it has been developed, because the dyes which are formed with conventional chemical color development of film make each film layer spectrally unique. However, just as with conventional scanners, once initial red, green, and blue values are derived for each image, further processing of the red, green, and blue values is usually done to enhance and/or manipulate the image.

The digital film development system shown in FIGS. 1 and 2 can produce multiple digital image files for the same image, each image file having the back, front, and through values according to the method described above. It is desirable to create multiple BFT image files for the same image at separate development times so that features of the image which appear at various development times are recorded. During the film development process, the highlight areas of the image (i.e., areas of the film which were exposed to the greatest intensity of light) will develop before those areas of the film which were exposed to a lower intensity of light (such as areas of the film corresponding to shadows in the original scene). Thus, a longer development time can allow shadows and other areas of the film which were exposed to a low intensity of light to be more fully developed, thereby providing more detail in these areas. However, a longer development time can also reduce details and other features of the highlight areas of the image. Thus, in conventional film development, the development time is typically chosen as a compromise between highlight details, shadow details and other features of the image which are dependent on the duration of development. However, in the digital film development process of FIGS. 1 and 2, such a compromise need not be made, as digital image files can be created at multiple development times.

In particular, as shown in FIG. 1, a pair of digital image files 124 and 126 can be created. The file 124 comprises a plurality of pixel values 128, each of which has B, F, and T values, representing attenuation by silver metal grains in the three film layers. Likewise, the file 126 comprises a plurality of pixel values 128 which represent colors. The digital image file 124 is created by scanning a frame (using source 110 and sensor 102) on the film 112 during a first film development time of the film, and the digital image file 126 is created by scanning the same frame during a second film development time. Once these files 124 and 126 are created, they can be combined into a single digital image file, which can include various features from both files.

However, in order to combine such files 124 and 126 of the same frame, the files must be aligned, to ensure that pixel data from one file are properly matched with pixel data from the same area of the frame on the other file. Alignment or matching of the images 124 and 126 needs to be conducted because transportation of the film 112 during scanning can change the orientation of the film such that it differs slightly between scannings at the different development times. Moreover, while the files 124 can be created by a first imaging module or imaging station, which includes a source 110 and a sensor 102, the file 126 might be created be a separate imaging station, which includes a separate source and a separate sensor 102. As the film is transported between the two distinct stations, the film will develop further, such that the files 124 and 126 are created during separate stages of the film development. Mechanical and positioning variations between these distinct imaging stations can cause skewing or misalignment of the data of one file 124 with respect to the data of the other file 126. Thus, the files 124 and 126, although representing the same frame of the film, might include data from slightly different areas near and around this frame.

Accordingly, as shown in FIG. 1, an image alignment circuit 122 is provided as part of the image processing electronics 120. According to principles of the present invention, the image alignment circuit 122 aligns the files 124 and 126 by examining the mathematical correlation between a portion of one file with respect to a portion of the other file. A high correlation between the two indicates a high chance that the two portions represent the same area on the film 112. Conversely, a low correlation between two portions indicates a low chance that the two portions represent the same area on the film. A portion from one of the files 124 and 126 can be paired with a number of different portions of the other file, and a correlation determined for each match. The best correlation can then be chosen and the pairing corresponding to that correlation can be utilized to align the two files 124 and 126.

Once aligned, the pixel data 128 from one file 124 will have corresponding pixel data 128 from the other file 126. Corresponding data can then be combined or otherwise processed to form a single enhanced image file. However, some pixel data 128 might not have corresponding data in the other file, because the two files 124 and 126 were scanned at slightly different places on the film 112, due to such differences discussed above, such as differences in scanning equipment and film transportation, for example.

Thus, the files 124 and 126 could be created by separate imaging stations, and the alignment circuit 122 can be used to align these files. Alternatively, the files 124 and 126 could be created by the same imaging station. For instance, file 124 could include back and back-through values which are sensed by a back sensor 102, and filed 126 could include front and front-through values which are sensed by a front sensor (not shown). However, the back sensor might not be perfectly aligned with the front sensor, and so the alignment circuit 122 could be utilized for creating a single file from data sensed from the two sides of the film. Accordingly, the circuit 122 and alignment methods discussed herein can be utilized for alignment of image data between scanning stations and for alignment of image data from separate sensors in the same imaging station.

In the case of intra-station alignment, once the two images 124 and 126 have been aligned by the circuit 122, alignment calibration parameters or coefficients can be calculated and saved which indicate the deviation between the two files. For example, "offset" parameters can be determined which indicate how far one file deviates from the other. An offset parameter of (1, 2), for instance, might indicate that the second file deviates by one pixel in the X direction and 2 pixels in the Y direction. Multiple alignment attempts can be made between the same and/or different files, and the calibration parameters from these attempts utilized to form a single set of calibration parameters, such as by averaging for example.

Once the calibration parameters have been established, the alignment circuit 122 can be programmed to use these parameters to align data which is taken. In this way, the alignment process can be made more efficient, and the processing required for correlating portions of files need not be repeated. Periodic re-calibrations can be conducted as needed and as desired for tuning the alignment calibration parameters to account for any changes which may have occurred within the imaging station. Generally, calibration cannot be used for most alignment errors between stations, as such errors can vary randomly. For example, the skew of the film between stations may vary due to tolerances of the film transportation system which secures and moves the film. However, calibration may be useful for errors between imaging stations or within imaging stations that remain relatively constant from frame to frame and from film strip to film strip.

Figure 3:
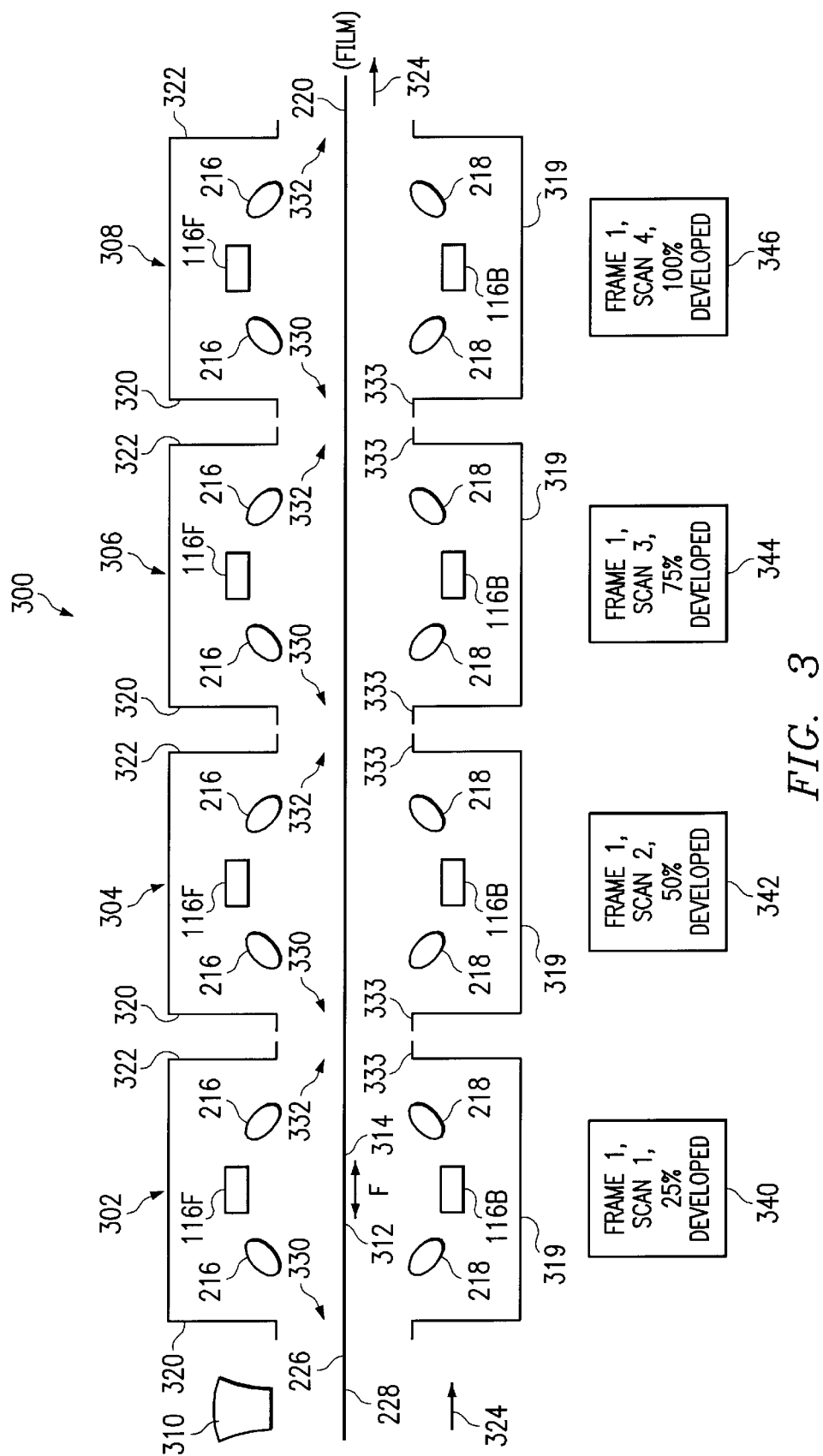
FIG. 3 is a schematic view of an exemplary digital film development system which utilizes multiple imaging stations to create multiple digital images of each frame of film at multiple film development times.
Figure 6C:
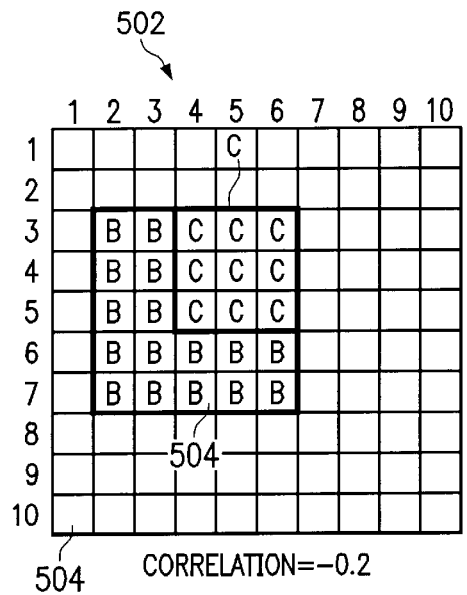
Figure 6D:
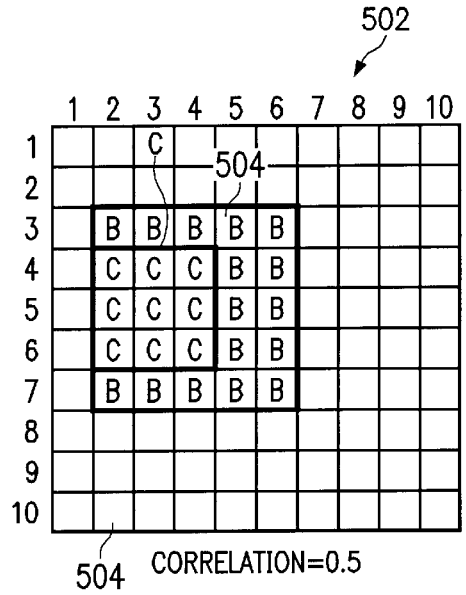
Figure 6E:
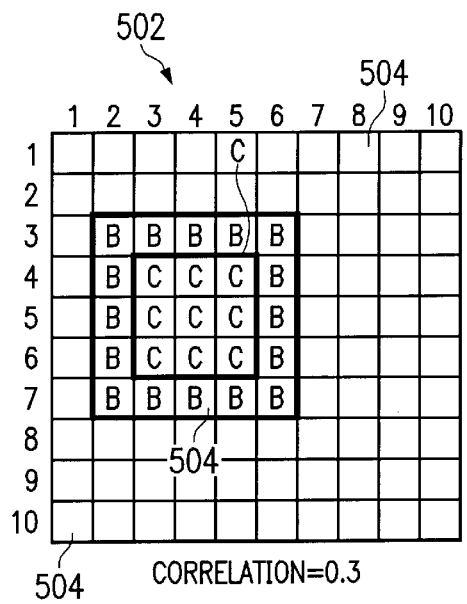
Figure 6F:
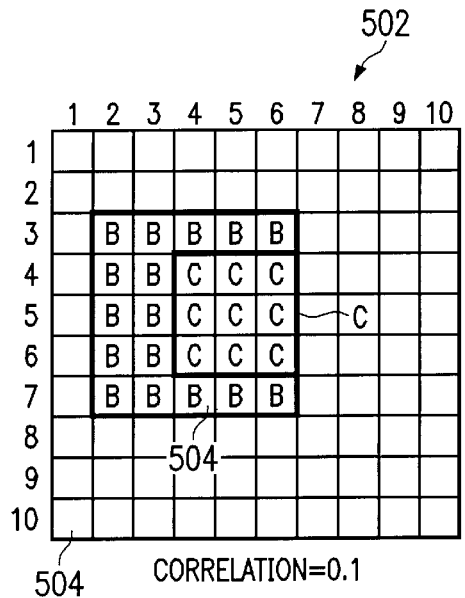
Figure 6G:
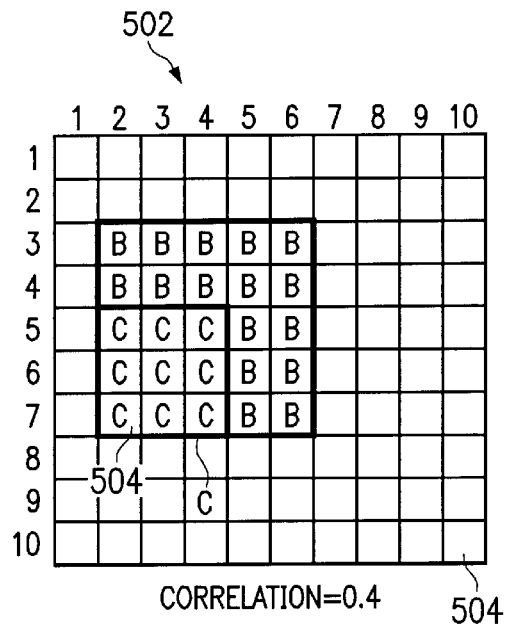
Figure 6H:
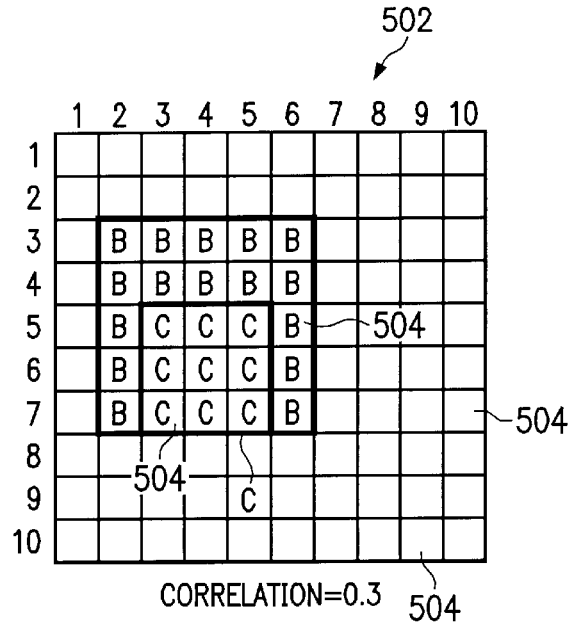
Figure 6I:
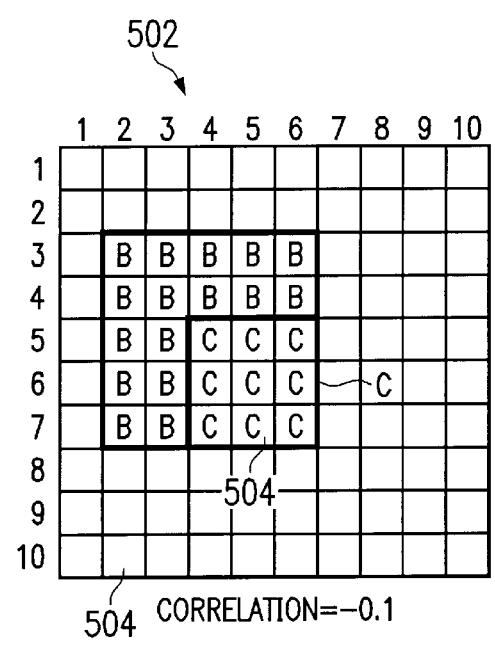

FIG. 3 shows an exemplary digital film development system 300 in which multiple scanning modules 302, 304, 306, and 308 are utilized to produce the multiple digital image files of the same image. Each module 302, 304, 306, and 308 in the digital processing system 300 includes a front source 216, a back source 218, a front sensor 116F, and a back sensor 116B, which operate as described above with respect to FIGS. 1 and 2. In particular, with reference to FIGS. 2 and 3, the front sensor 116F detects reflected radiation 222 (generated by front source 216), and also transmitted radiation 230 (generated by the back source 218). Likewise, the back sensor 116B detects the reflected radiation 224 (generated by back source 218), and the transmitted radiation 240 (generated by the front source 216).

Referring now to FIG. 3, the modules 302, 304, 306, and 308 are serially connected to form the system 300. Thus, the film travels in the direction 324 from the first module 302, to the second module 304, to the third module 306, to the fourth module 308. Finally, the film 320 exits from the system 300 via the film output side 322 of the fourth module 308.

The film 220 can be transported as a continuous strip through the modules 302, 304, 306, and 308 by a suitable film transportation or conveyance system. Because of the time lag between transportation of an image on the film 220 between the modules 302, 304, 306, and 308, each module scans and records a digital image file of a given frame at a different development time during the development of the film.

For example, each image or frame on the film, such as frame F which resides between the points 312 and 314, could have developer applied thereto, such as by dispenser 310. The transportation system would then move the frame F to module 302, where a first digital image file 340 is created, using two reflectance signals (a back reflectance signal and a front reflectance signal) and one transmission signal (a back-through signal or a front-through signal) as described above. The frame F would then be transported to module 304 where a second image file 342 is created of the same frame, again using two reflectance signals and one transmission signal. However, because of the predefined time lag in transporting the frame F from the first module 302 to the second module 304, the frame would be scanned by the second module 304 at a later point in the development of the image in the frame F. Thus, some features of the image which might be appearing within the frame F during the development of the film 220 might be captured in the first data image file 340, but not in the second data image file 342, and vice versa.

The additional modules 306 and 308 can be connected into the system 300 to provide additional image data files for the frame F at additional development times of the frame. For example, after the second image data file 342 is created for the frame F by the second module 304, a third image data file 344 could be created for the frame F at a later development time by the third module 306 which would obtain two reflectance signals and one transmission signal. Similarly, a fourth image data file 346 could be created by the fourth module 308 at the longest development time, also by obtaining two reflectance signals and one transmission signal. In this manner, four digital representations 340, 342, 344, and 346 of the same frame image may be obtained at different development times, such as at 25%, 50%, 75%, and 100% of the total n development time, for example. These four digital representations 340, 342, 344, and 346 may then be combined with one another (i.e., stitched together) to form a composite digital representation of the image. However, alignment of the four images must take place in order to conduct such a combination. The image alignment circuit 122 of FIG. 1 can be utilized for this purpose, as can the exemplary methods of alignment discussed below. Once the images have been aligned and combined, the final digital representation may be viewed on a video monitor associated with a computer, or printed on a printer connected to computer (such as a laser printer or an ink jet printer).

Figure 4:
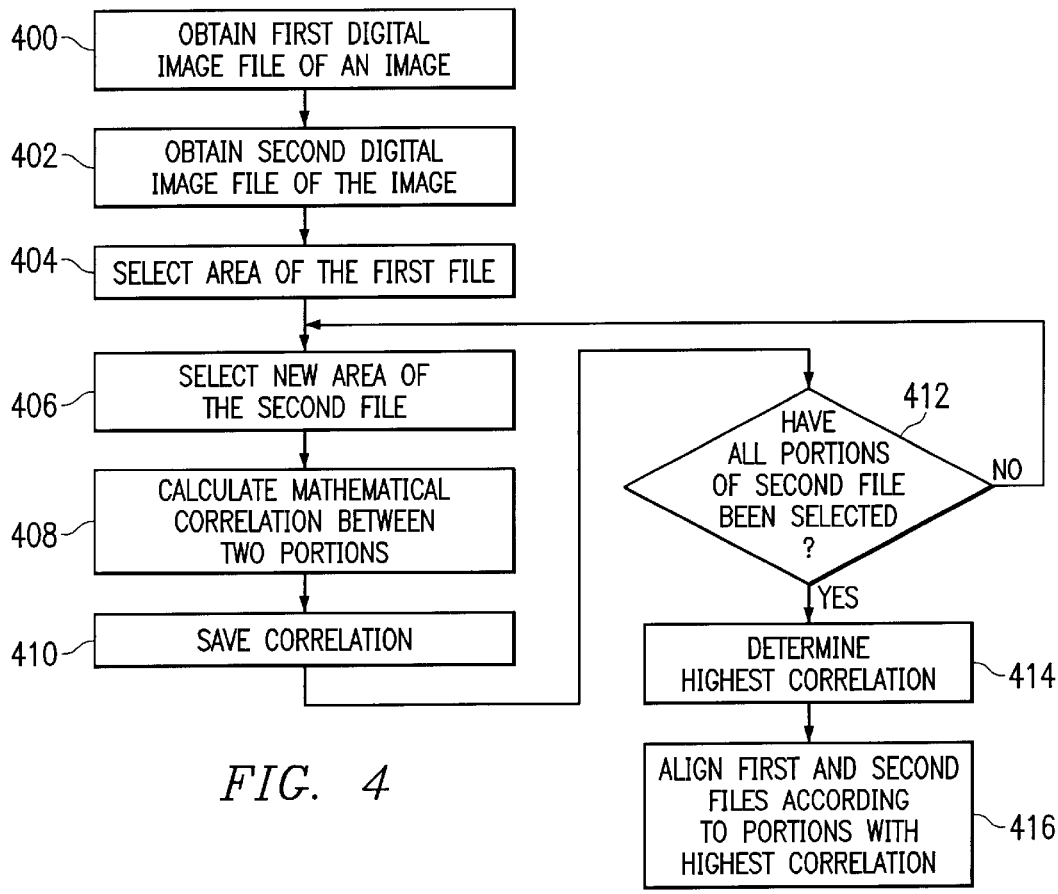
FIG. 4 is a flow diagram illustrating an exemplary method of aligning two digital images using the correlation between two regions of the images, according to principles of the present invention.

FIG. 4 is a flow diagram illustrating an exemplary film alignment method, which operates in accordance with principles of the present invention. At step 400 of the method a first digital image file comprising pixel data is obtained, and at step 402 a second digital image file comprising pixel data is obtained. The first and second digital image files represent substantially the same portion of a medium, such as the same general area on a film medium or paper medium for example. For instance, two scans of a frame of film can be conducted to create the files which are obtained in steps 400 and 402. Alternatively, two scans of same piece or same portion of paper can be conducted during these steps. Thus, the alignment methods and apparatus discussed above have application to the digital film development process discussed with respect to FIGS. 1–3, as well as to other digital scanning or imaging processes which require the alignment of two or more digital images.

Once the digital image files are created, a portion of each file is selected, at steps 404 and 406. Referring now to FIGS. 5a and 5b, the first digital image of an area of the film or paper medium is labeled with reference numeral 500 and the second digital image representing the same area on the medium is labeled 502. Generally, each file 500 and 502 contains data which represents an array of pixels 504, each pixel having data which represents the color (and/or gray level) of a small portion of the image which was scanned. For example, one file 500 or 502 could comprise back and/or back-through values which represents radiation detected at the back of the film, and the other file could comprise front and/or front-through values which represent radiation detected at the front of the film. Moreover, after alignment of back and front data according to the present invention to create a combined back, front, and through data set, the alignment method could be utilized again to align such combined data sets. For example, one file 500 or 502 could comprise a combined back, front, and through data set taken at a first development time, and the other file could comprise a combined back, front, and through data set taken at a second development time, by the same or different imaging equipment. Thus, the present invention can be utilized to align two partial digital images, such as produced by two sensors in a single imaging station, as well as to align two full digital images, such as produced by two different imaging stations.

Each file 500 and 502 includes a value or values for each pixel scanned which represents non-uniformity in the medium itself, rather than an image formed or forming on the medium. Analyzing medium non-uniformity between two scans can provide better results in aligning the two scans than can be achieved by utilizing the image data itself. This is because sometimes suitable objects for use in alignment can not be found in the image itself. For instance, a digital image of a picture of the moon at night may not include sufficient non-uniformity in the image for correlation with another digital image of the same picture. Also, when the picture scanned is not very exposed or when the digital image is taken from film which is underdeveloped, (for example when being scanned by the first imaging station 302 of FIG. 3) the scene content may be barely visible. Thus, using such a scene for alignment can be difficult, because color differences between objects may be non-existent or difficult to detect.

Accordingly, it is preferred that the pixels 504 include data related to a non-uniformity in the scanned medium. For instance, if film were scanned, the "grain" of the film can be recorded and utilized for alignment. As discussed above with respect to FIGS. 1, 2, and 3, a digital film development system can record back (B), front (F), and through (T) values which are indicative of the density grains developing on the film. The "grain pattern" or an area of film can be independent from the scene content on the film and can vary randomly across the entire film strip. However, the grain pattern of an area of film remains constant throughout film development, and thus would look the same whether recorded early in the film development (such as by station 302 of FIG. 3) or later in development (such as by station 308 of FIG. 3). Accordingly, this non-uniformity of the film medium is independent of the scene or image on the medium, and will appear even if the scene or image is blank. Moreover, slight differences in film grain will appear in a portion of the pixel data 504 due to the non-uniformity of the film, even if no perceptible differences exist in the scene which that portion of pixel data represents. For example, a blue sky on film may appear uniformly blue. However, differences in film grain can cause slight differences in the pixel data 504 which is recorded for that blue sky. Thus, although it may be difficult to utilize any color difference from the blue sky to align two or more digital images of the blue sky, alignment according to principles of the present invention can still be conducted by utilizing small portions of the pixel data 504 which make up the blue sky in the image.

Thus, non-uniformities can be recorded in the pixel data 504, such as by recording back, front, and through values. This pixel data 504 can then be correlated between the two digital images 500 and 502 to align the images, as described in further detail below. Other non-uniformities of the film can be recorded in the pixel data 504 and utilized for alignment according to the present invention. For instance, non-uniformity in the antihalation layer of film could be recorded. The antihalation layer is a fourth layer of the film between the colored layers and the base, and its primary purpose is to prevent light from deflecting uncontrollably within the base and traveling to other areas of the film. Often, the antihalation layer has developed particles of silver within it which are chemically removed during development. The layer is not sensitive to light and does not change during development. Accordingly, non-uniformity of the sliver grains in the antihalation layer could be recorded and utilized for alignment according to principles of the present invention.

Exemplary methods and systems of image alignment utilizing pixel data, such as data representing the medium non-uniformity, will now be described in further detail. With reference to FIGS. 5a and 5b, the position of a pixel 504 in relation to the overall image can be identified by its horizontal position number 506 and its vertical position number 508. Portions of each file 500 and 502 can be selected by using the identification numbers of pixels in the file. In the example of FIG. 5a, a portion A of file 500 can be selected by selecting all pixels having a horizontal identification number 506 between 3 and 5 and a vertical identification number 508 between 4 and 6. Likewise, a portion B of file 502 can be selected by selecting all pixels having a horizontal identification number 506 between 2 and 6 and a vertical identification number 508 between 3 and 7. As discussed in further detail below, correlations between the portion A and various subdivisions of the portion B will be determined. Thus, portion A can be referred to as a "template" region, and portion B can be referred to as a "search" region, which has a various subdivisions or "variable regions" C (shown in FIG. 6).

The areas A and B which are selected from the two files 500 and 502 can be differing in size. For instance, in the example of FIG. 5, portion B encompasses a greater number of pixels than does portion A. Also, in this example, it is preferred that one of the areas A or B has pixel identification numbers which overlap with the pixel identification numbers of the other area A or B. More preferably, the area A or B is encompass within the same pixel identification range as the other area A or B. For instance, the pixels of area A in FIG. 5a are pixels (3, 4) through (5, 6), which are encompassed within the same identification range as the pixels of area B in FIG. 5b, which are pixels (2, 3) through (6, 7). One way to achieve such a relationship between the areas A and B is to choose a pixel range for area A, and then add or subtract an amount from that range to select B.

If areas of two differing sizes are chosen for areas A and B, as in FIGS. 5a and 5b, then a smaller portion of the larger area should be selected for comparison with the data of area A. Such a selection of a smaller portion of area B is shown in FIG. 6a through FIG. 6i. In this example, various areas C are selected from the area B of file 502 for comparison with area A of file 500. The portion C selected from area B is preferably the same size, in terms of number of pixels, as that of area A.

The size of the area B can be adjusted according to the amount of misalignment that is expected. In other words, if the uncertainty in alignment is large (e.g., due to high mechanical tolerances in film transportation between imaging stations), the search area B can be made to be much larger than A, and when the uncertainty is small, B can be made only slightly larger than A.

In addition, A can be varied to achieve desired accuracy. As the size of A increases, the resulting mathematical correlation has more data upon which to operate and compare, and so the result has higher accuracy. By way of example, A can be varied from between about 8×8 pixels to about 80×80 pixels in size. Preferably, B ranges from as little as 6 pixels wider than A to as much as 200 pixels wider than A. For instance, B can range from about 14×14 pixels to about 280×280 pixels in size. However, other suitable ranges can be selected.

Accordingly, in the embodiment of FIG. 4, step 404 or step 406 could include a sub-step which further divides the area which is selected. For example, in FIG. 6, a smaller portion C of the area B is chosen, such that the it matches, in size, the area A.

Returning again to FIG. 4, once areas are chosen for the two areas from the two files, step 408 can be executed. During this step, a correlation is determined between the data which makes up one area and the data which makes up the other area. For instance, a mathematical correlation calculation can be conducted which measures the degree of correspondence between the data or variables which make up one area and the data or variables which make up the other area. Any number of correlation algorithms and/or equations can be utilized for this purpose, some of which are discussed in more detail below.

For instance, one method of calculating a correlation between two sets of variables or data is to divide the covariance of the sets by the square root of the product of the variance of the sets. The closer the correlation value is to 1, the greater the correlation or correspondence between the two sets.

With reference to the area A of FIG. 5a and the area C of FIG. 6a, an equation for correlation ρ is shown below. In particular, the correlation ρ is the covariance of A and C, divided by the square root of the product of the variance of A and the variance of C:

$$\rho = \frac{(COV(A, C))}{\sqrt{(VAR(A) \times VAR(C))}} \quad (1)$$

The explicit computations involved in the above equation can be found in the following equation, where the summation shown is taken over each data component of the pixel area (A or C) and the overbar indicates the average value of the data from that pixel area:

$$\rho = \frac{\sum((A - \overline{A}) \times (C - \overline{C}))}{\sqrt{\left(\sum(A - \overline{A})^2 \sum(C - \overline{C})^2\right)}} \quad (2)$$

Thus, in this example, the correlation ρ is a number between 0 and 1.0. A correlation of 1.0 indicates that the areas A and C have identical data. A coherence which is 0, suggests that the areas A and C have data values which are random and independent.

Returning to the example of FIG. 4, once the correlation is calculated, it can be saved, at step 410, along with an identifier that identifies the pixels from which the ranges A and C were taken.

Once the correlation for a given position of C is saved, then step 412 can be executed to determine whether correlations for other positions of C should be attempted. The position of area C can be changed a sufficient number of times to encompass all of the search area B. However, the position of area C can be varied any suitable number of times and across any suitable portions of the image file 502.

If additional correlations are to be calculated for additional positions of area C, then the method of FIG. 4 can loop back to step 406, where a new area C is selected. Another correlation coefficient can then be calculated and saved for the new area, at steps 408 and 410.

For instance, in the example of FIGS. 5 and 6, the range of A remains constant at (3, 4) through (5, 6), and this range can be saved or recorded. The range of C, however, can be varied. In FIG. 6a, the range of C is (2, 3) through (4, 5), in FIG. 6b, the range of C is (3, 3) through (5, 5), and in FIG. 6c, the range of C is (4, 3) through (6, 5). Thus, C can be moved one pixel at a time in the horizontal direction until it reaches the edge of B. Then, as shown in FIGS. 6d through 6f, the range of C can be moved one pixel in the vertical direction, and then moved again through the three horizontal positions. This movement can then be repeated for C in FIGS. 6g through 6i, where the range of C ends up at (4, 5) through (6, 7).

Each of the areas C in FIG. 6 can have varying pixel data values. This is true even if the scene which is represented by the portion B has a substantially uniform visible color, due to the medium non-uniformity discussed above. Thus, a separate correlation between the pixel data of area A and area C can be calculated for each of the various positions of area C in FIGS. 6a through 6i. As shown in these examples, various correlation values can be calculated depending on the position of the area C, some of the correlation values being higher than others. For instance, the correlation calculated for FIG. 6d is relatively high (0.5) compared with the correlation calculated for FIG. 6f (0.1). Each correlation can be saved with an identifier which indicates the pixel ranges from which areas A and C were selected for that correlation.

Returning again to FIG. 4, once a sufficient number of correlations have been determined, then the process may proceed to step 414, where the highest correlation value for the various positions of area C can be determined, such as by comparing the various saved correlation values. As an alternative to saving and comparing all correlation values, as new correlation values are calculated, the correlation value for the current position of the area C can be compared to the highest previous correlation value for the previous positions of C, and the higher of the two saved.

Thus, after step 414, the highest correlation value for the various positions of the area C is known. Accordingly, the position of the area C with the highest correlation has the highest probability of being scanned from the same area of the medium as area A.

Thus, alignment of the two image files can be conducted according to the areas of the two files with the highest correlation. This is shown at step 416 of FIG. 4. For instance, the position of area C in FIG. 6d resulted in the highest correlation with the area A of FIG. 5a. Thus, the highest probability is that the data of pixels (3, 4) through (5, 6) of image file 500 corresponds with the data of pixels (2, 4) through (4, 6) of image file 502, and that the data in these two ranges were scanned from the same area of the scanned medium. To align the two image files 500 and 502 using these ranges, all data in file 502 can be shifted by +1 in the horizontal pixel range to determine the corresponding pixels from file 500. Alternatively, all data in file 500 can be shifted by −1 in the horizontal pixel range to determine the corresponding pixels from file 502. This could mean that the scanning equipment and/or film was slightly skewed in the horizontal direction during the scanning of files 500 and 502. Once proper alignment has been determined, the files 500 and 502 can be combined to form a single enhanced image file, and/or to conduct other image processing. Rather than shifting all portions of both files 500 and 502 by the same amount, alignment can occur on a portion-by-portion basis. According to this alternative, the steps 404 through 414 could be repeated for a different area A of the first file and for new or differing areas C of the second file. In this manner, alignment offsets can be tailored for various portions or sectors of the two files. For instance, the file 500 can be divided into a plurality of areas A, such as hundreds or thousands of areas A for example. Each area A will have a plurality of corresponding areas C from the second file 502 which are mathematically correlated with the corresponding area A. Alignment can then occur for each area A of the first file 500.

Also, the alignment of the two areas A and C could then be used for subsequent alignment of images later scanned, especially for alignment errors which are relatively constant, such as alignment offsets between two sensors in the same imaging station. For instance, rather than repeating steps 404 through 414 of FIG. 4 on subsequent scannings, one or more alignment calibration coefficients or offsets can be calculated. In the example of FIGS. 5 and 6 above, the first imaging station which produced the file 500 would have alignment offsets of (−1, 0) with respect to the second station which produced file 502, and the second station would have alignment offsets of (1, 0) with respect to the first station. To ensure that the alignment offsets are accurate, the steps of FIG. 4 could be repeated a number of times on image files 500 and 502, and/or on different image files. Offsets can then be calculated from the plurality of results, such as by averaging the results for example.

Figure 7:
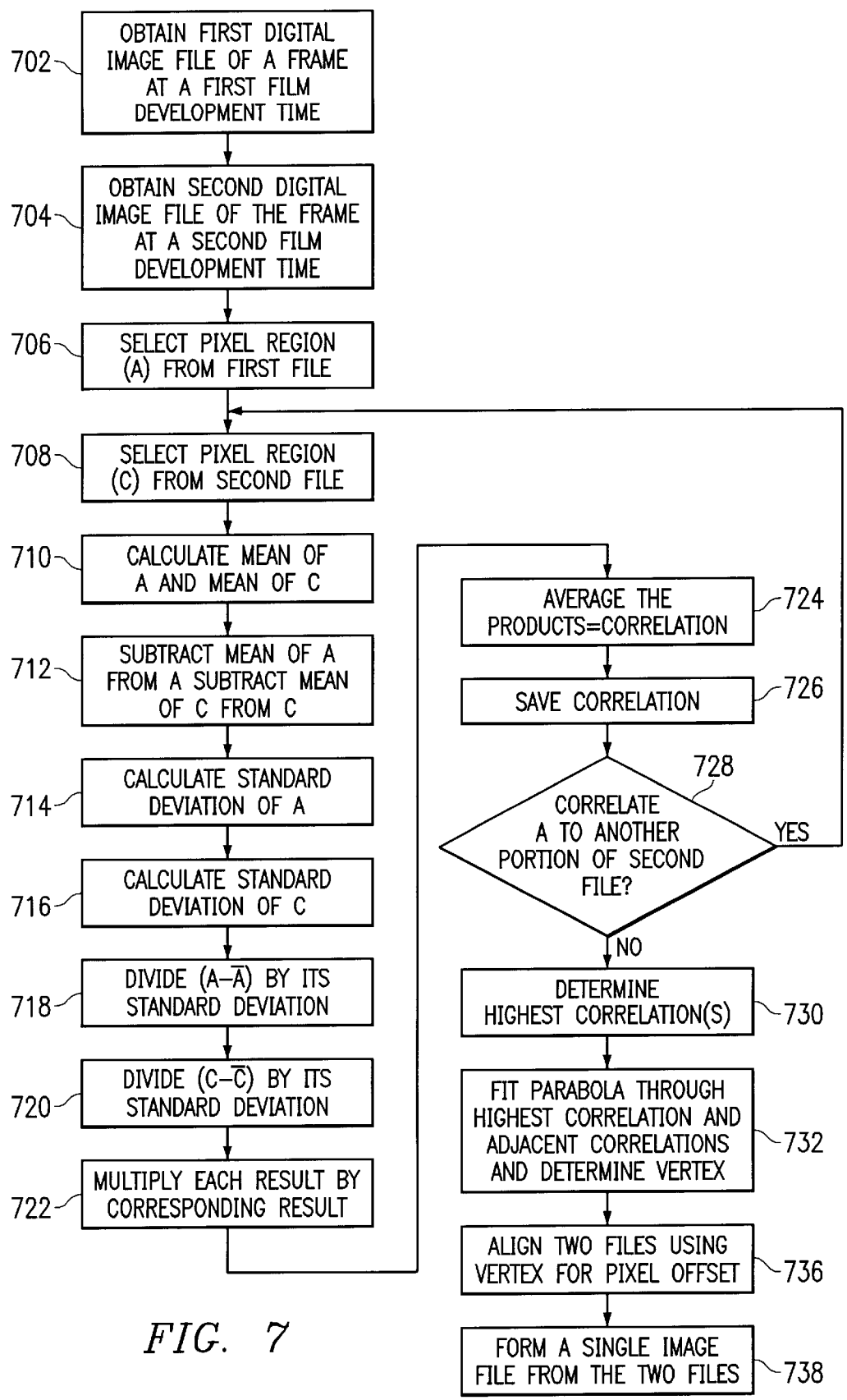
FIG. 7 is a flow diagram illustrating another exemplary embodiment of an image alignment method according to principles of the present invention.

FIG. 7 illustrates an alternative method for aligning images by correlating portions of the data of each image. In this embodiment, the alignment method is applied to digital film development, such as described above with respect to FIGS. 1–3, although the method could have application to various scanning methods and apparatus. At step 702, a first digital image data file is created by scanning a frame (or portion) of film while the film is developing, during a first film development time. Then, at step 704, a second digital image data file is created from the same frame or same portion of the film. However, the stage of film development is different during step 704 than during step 702. Accordingly, two digital or electronic images are created from the same general portion of film during two separate development stages of the film. Two separate imaging stations can be utilized to produce these images. However, due to variances in film travel and position, and/or due to equipment differences, the two digital images may not represent the exact same portion of the film. While most of the data taken should be from the same area of film, some of the data may not be, and the two images may be skewed or offset relative to one another. Accordingly, steps 706 through 736 can be used to align the two digital images.

More specifically, at step 706, a pixel region A is selected from the first file. Although this region A can be any number of pixel sizes and can be selected from any of a number of areas of the image, it preferably has a size of between about 8×8 pixels to about 80×80 pixels and is selected from the center of the image. For example, A could have a size of about 20×20 pixels. Then, at step 708, a second pixel region, region C, is selected from the second file. As discussed above, this region is preferably of the same size as region A and is preferably selected from a larger region of the second file which generally corresponds with where the region A of the first file would be expected to be found in the second file.

Figure 8A:
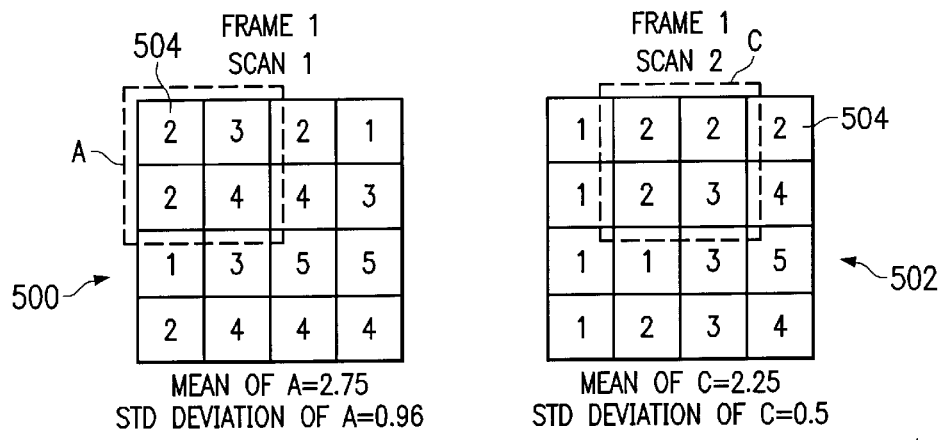
FIGS. 8a through 8d, and FIGS. 9a through 9d illustrate exemplary image data which can be processed and correlated using the exemplary method of FIG. 7.
Figures 9A, 9B, 9C, 9D:
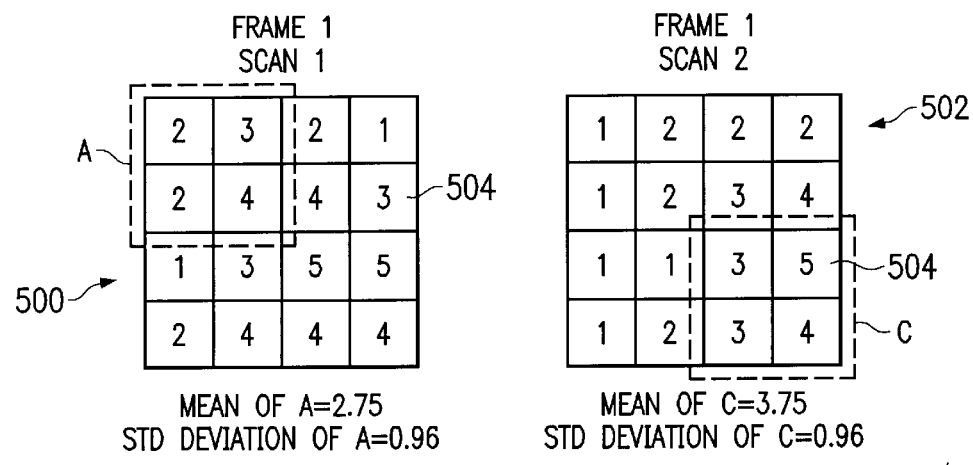

Once these two regions are selected, the correlation between the data in these two regions can be determined. In the exemplary embodiment of FIG. 7, steps 710 through 724 can be utilized to calculate a mathematical or statistical correlation between the two regions. In particular, at step 710, the mean, or average, of region A is calculated, and the mean of region is calculated. FIGS. 8a and 9a show exemplary data for two image files (or partial image files) 500 and 502. In both figures, the region A is selected from the upper left portion of the file.

However, in FIG. 8a, the region C is selected from the upper middle of the file 502, and in FIG. 9a, the region C is selected from the bottom right of the file 502. In FIG. 8a, the mean of the pixel data 504 in region A is 2.75, while the mean of the pixel data 504 in the region C is 2.25. In FIG. 9a, the mean of region A is 2.75, and the mean of C is 3.75.

Figure 8B:
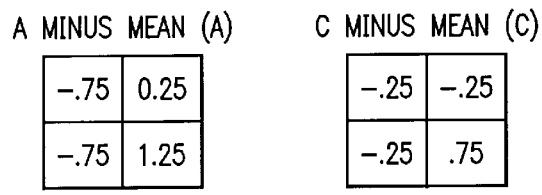

Returning again to FIG. 7, at block 712, for each pixel in region A, the mean of A is subtracted from the pixel value. Likewise, the mean of C is subtracted from the pixel values in C. FIGS. 8b and 9b show an example of the results of such an operation on the corresponding data for these regions.

At block 714 of FIG. 7, the standard deviation of the region A is calculated, and at block 716, the standard deviation of the region C is calculated. Standard deviation (S) is the square root of the variance (V) of data values. The variance can be the calculated by finding the difference between each of the N individual data values and the mean of the values (as shown in FIG. 8b and FIG. 9b). These differences are then squared, the squares are added up, and the total is divided by N−1. The standard deviation S is then obtained by taking the square root of V. In the example of FIGS. 8a and 9a, the standard deviation for the region A is 0.96, and the standard deviation for the region C is 0.5 in FIG. 8a and 0.96 in FIG. 9a.

Figure 8C:
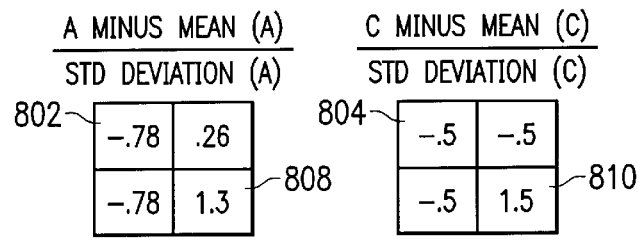

With reference again to FIG. 7, each difference between a pixel value of A and the mean of A is divided by the standard deviation of A, at step 718. Likewise, each difference between a pixel value of C and the mean of C is divided by the standard deviation of C, at step 720. The results of these steps for the examples of FIGS. 8 and 9 are shown in FIGS. 8c and 9c. Next, at step 722, the results of steps 718 and 720 are multiplied for each corresponding pixel. Thus, referring to FIGS. 8c and 8d, the result 802 from region A is multiplied by the corresponding result 804 from region C to get the product 806. Similarly, the result 808 is multiplied by result 810 to get the product 812. This multiplication is made for each pixel place, as shown in FIGS. 8c and 8d, and FIGS. 9c and 9d. Accordingly, there are an equal number of results as there are pixels in region A or pixels in region C. To keep track of the data in regions A and C, and the corresponding calculations which are performed thereon, suitable programming variables, arrays, pointers and the like can be utilized.

Figure 8D:
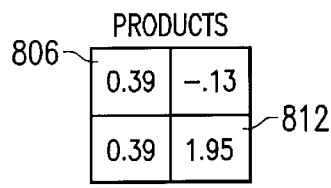

Finally, at step 724, the correlation coefficient or correlation value is calculated by averaging the products from step 722. As shown in FIG. 8d, the correlation between A and C for the regions of FIG. 8a comes to 0.65. However, as shown in FIG. 9d, the correlation between A and C for the regions of FIG. 9a comes to 0.48. (While the region A stays the same between FIGS. 8a and 9a, and thus has the same data, the region C, and the data therefor, changes between the two figures.) Thus, there is a higher correlation between the data for the regions A and C for FIG. 8a than there is between the data for the regions A and C for FIG. 9a. Accordingly, it is more likely that regions A and C of FIG. 8a were recorded from the same area of film than it is that regions A and C of FIG. 9a were recorded from the same area of film.

An alternative method for calculating the correlation between the regions A and C would be to divide A minus the mean of A by the product of the standard deviation of A and the square root of the number of pixels in A. Then, C minus the mean of C could be divided by the product of the standard deviation of C and the square root of the number of pixels in C. The results can then be multiplied and the products added to determine the correlation value.

Figure 10A:
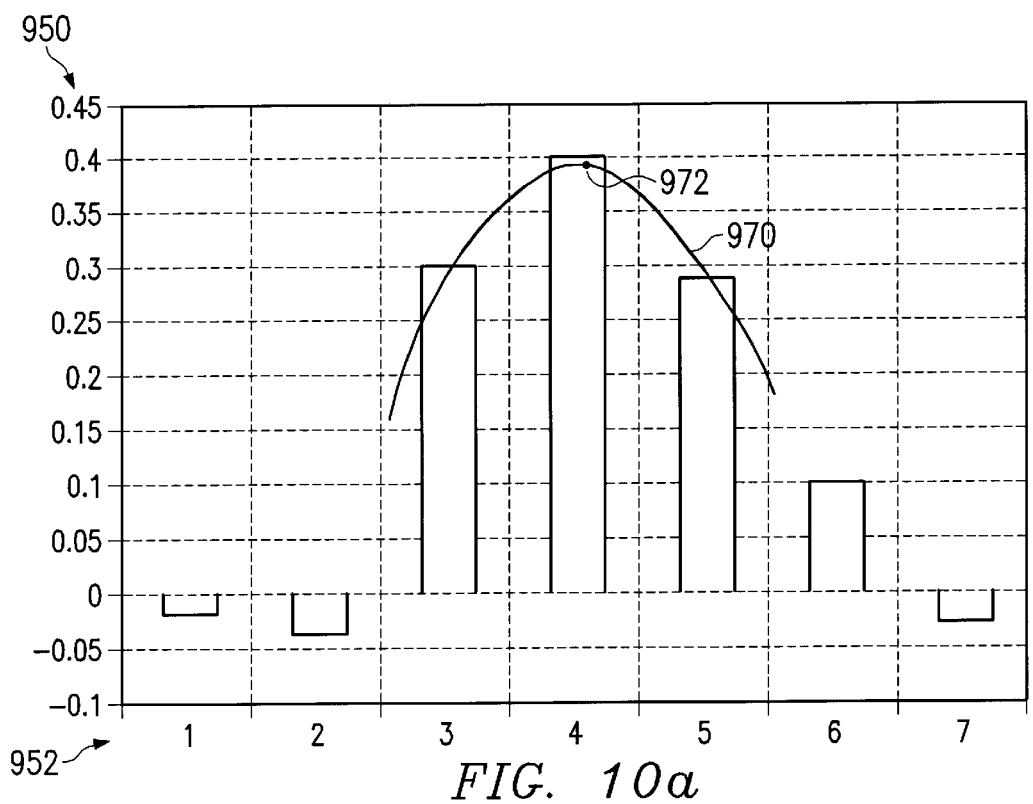
FIG. 10a and FIG. 10b illustrate exemplary correlation values which may be derived using principles of the present invention.

Returning again to FIG. 7, the correlations for the various regions C can be saved, at step 726. At step 728, it is decided whether to attempt to correlate region A from the first file with another region of the second file. If so, then the process returns to step 708, where another region C can be selected, and another correlation value for that region determined. If not, then the process continues to step 730, where the highest correlation value is determined. As shown in FIG. 10a, a variety of correlation values 950 are calculated for a variety of positions 952 of the variable region C. In this example, the fourth position 952 of the region C provided the highest correlation value (around 0.4). In addition, the correlation value at this position is significantly higher than the correlation values at other positions. Thus, this fourth position of the variable region C would most likely have been scanned from the same area of the film as region A, and can be used to align the two images. A comparison of all the correlation values can reveal the highest correlation.

Although only horizontal movement of the region C is shown in FIG. 10a, as noted above, the data shown can extend in a second dimension as the region C can be varied in horizontal position as well as in vertical position.

Figure 10B:
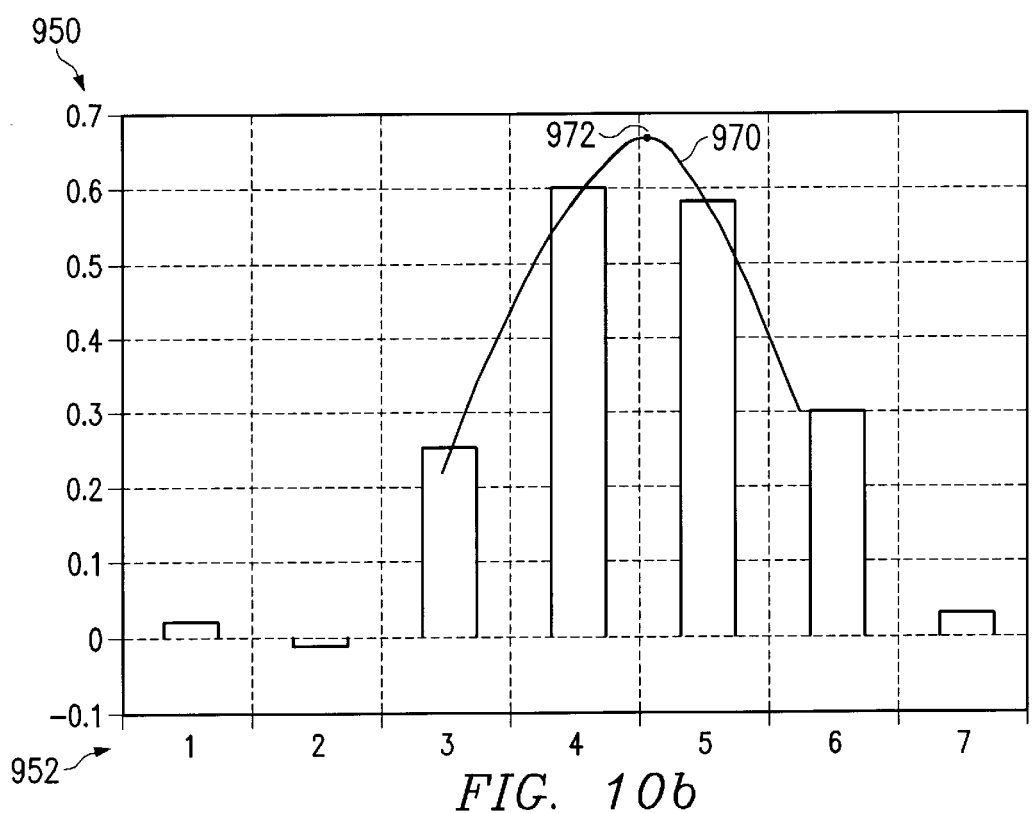

In contrast to FIG. 10a, FIG. 10b illustrates the potential situation where more than one position 952 of the region C has a significantly higher correlation than the other positions. In particular, position 4 has a correlation of 0.6, and position 5 has a correlation of nearly 0.6. Such a situation can be accommodated by the exemplary method of FIG. 7. In particular, at step 732 of FIG. 7, a parabola can be fit through the highest correlation and the two correlations which are adjacent (i.e., on either side of) the highest correlation, such as by using a curve fitting algorithm or the like. Such a parabola 970 is shown in FIGS. 10a and 10b. The vertex or peak 972 of the parabola 970 could then be determined, at step 732, and utilized for alignment of the two files, at step 736.

For example, in FIG. 10a, the vertex 972 of the parabola 970 corresponds to a pixel position of 4.0. If this corresponded to a horizontal shift between areas A and C of 4 pixels, then, at step 736 of FIG. 7, the data of A can be shifted by 4.0 pixels to align with the data of C. In the example of FIG. 10b, the vertex 972 is at a horizontal pixel shift (of region A relative to region C) of around 4.5 pixels. To achieve such an offset, pixel number 1 of the first image could be matched with two pixels, pixels 4 and 5, in the second image. An example, of such a sub-pixel alignment is shown in FIG. 11. An average value or some other suitable combination of pixels 4 and 5 of the second image 502 could be utilized for alignment with pixel 1 of image 500. Likewise, pixel 2 of image 500 could be aligned with a combination of pixels 5 and 6 of image 502, and so on.

Once the images have been aligned at step 736 of FIG. 7 using the parabola vertex determined for the two images, then the process may continue and this alignment information can be utilized. For instance, at step 738, the two images can be combined to form a single image file which has features from each of the images. Alternatively or in addition, the alignment offset or coefficient can be utilized to calibrate the scanning system such that future images may be aligned.

The various exemplary methods and systems described above can be implemented in a number of ways, such as by providing a set of software instructions on a computer readable medium, or by providing a programmable apparatus having executable instructions suitable for carrying out steps stored in a RAM, a ROM, and/or other memory units. Any of a variety of suitable circuitry, digital computers, processors, and/or controllers can be utilized for this purpose.

The foregoing descriptions of the exemplary embodiments of the invention have been presented for purposes of illustration and description only. They are not intended to be exhaustive or to limit the invention to the precise forms disclosed, and modifications and variations are possible and contemplated in light of the above teachings. While a number of exemplary and alternate embodiments, methods, systems, configurations, and potential applications have been described, it should be understood that many variations and alternatives could be utilized without departing from the scope of the invention. Moreover, although a variety of potential configurations and components have been described, it should be understood that a number of other configurations and components could be utilized without departing from the scope of the invention.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method for aligning two or more digital images created by scanning the same portion of a medium, the method comprising:

obtaining a first digital image from a film frame by scanning the film frame at a first film development time;

obtaining a second digital image from the film frame by scanning the film frame at a second film development time;

selecting a target portion of the first digital image, wherein the target portion includes non-uniformity data representing the non-uniformity of a grain pattern on the film frame for the target portion selected;

selecting a first portion of the second digital image, wherein the first portion includes non-uniformity data representing the non-uniformity of a grain pattern on the film frame for the first portion selected;

calculating a first mathematical correlation between the target portion and the first portion based upon the non-uniformity data for the target portion and the first portion;

selecting a second portion of the second digital image, wherein the second portion includes non-uniformity data representing the non-uniformity of a grain pattern on the film frame for the second portion selected;

calculating a second mathematical correlation between the target portion and the second portion based upon the non-uniformity data for the target portion and the first portion;

determining an alignment offset between the first and second digital images using the mathematical correlations;

combining the first and second digital images based upon the alignment offset to produce a single digital image for the frame of the film.

2. The method as recited in claim 1, wherein at least one of the first and second mathematical correlations is calculated by dividing the covariance of the target portion and the first portion by the square root of the product of the variance of the target portion and the first portion.

3. The method as recited in claim 1, wherein the at least one of the calculating steps comprises the step of:

dividing the difference between each value in the target portion and the mean of the target portion by the standard deviation of the target portion.

4. The method as recited in claim 1, wherein the determining step comprises the step of:

comparing the first and second mathematical correlations to determine the greatest data correlation.

5. The method as recited in claim 1, wherein the determining step comprises the steps of:

determining the highest mathematical correlation from amongst the correlations;

fitting a curve through the point defining the highest correlation;

determining the vertex of the curve; and determining a pixel alignment offset using the vertex.

6. The method as recited in claim 1, wherein each of the obtaining steps comprises:

sensing radiation reflected from the back of a film medium;

sensing radiation reflected from the front of a film medium; and sensing radiation transmitted through the film medium.

7. The method as recited in claim 1 wherein the first and second digital images are created at the sonic imaging station.

8. The method as recited in claim 7, wherein the first digital image comprises data representing the amount of radiation reflected from the back of a film frame, and wherein the second digital image comprises data representing the amount of radiation reflected from the front of the film frame.

9. The method as recited in claim 1, wherein the first and second digital images represent the same frame on a developing film medium, and wherein the first and second digital images are created during separate film development times.

10. The method as recited in claim 1, wherein the target portion and the first and second portions have identical pixel sizes.

11. A method for aligning two or more digital images created by scanning the same portion of a medium, the method comprising:

selecting a target portion of a first digital image, wherein the target portion includes data representing the non-uniformity of a portion of photographic film;

selecting a search area of the second digital image wherein the search area includes data representing the non-uniformity of a portion of the photographic film;

selecting a variable area from the search area;

changing the variable area, and calculating a mathematical correlation between the target portion and the variable area far each change in the variable area using the data representing the non-uniformity;

determining an alignment offset between the images using the mathematical correlations; and combining the first and second digital images based upon the alignment offset to produce a single digital image for the portion of the film.

12. The method as recited in claim 11, wherein the determining step comprises:

determining the highest correlation from amongst the mathematical correlations;

fitting a curve through the highest correlation and its two adjacent correlations;

determining the vertex of the curve; and determining the alignment offset using the vertex.

13. The method as recited in claim 11, wherein the steps are repeated for a second target portion.

14. The method as recited in claim 11, wherein the first digital image comprises data representing radiation sensed from the back of a film region, and wherein the second digital image comprises data representing radiation sensed from the front of the film region.

15. The method as recited in claim 11, wherein the first digital image comprises data representing radiation sensed from a film frame during a first film development time, and wherein the second digital image comprises data representing radiation sensed from the film frame during a second film development time.

* * * * *